United States Patent Office 3,524,124
Patented Aug. 11, 1970

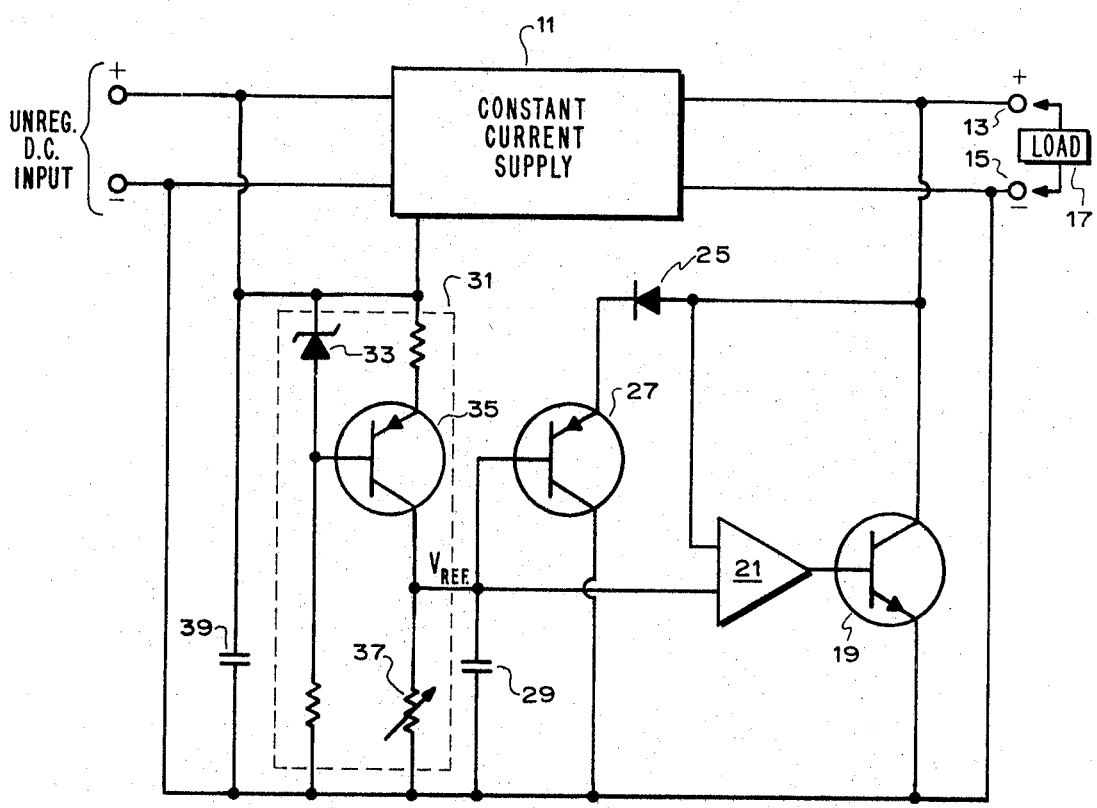

3,524,124
OUTPUT VOLTAGE LIMITING CIRCUIT FOR A CONSTANT CURRENT POWER SUPPLY
Joseph C. Perkinson, Somerville, N.J., assignor to Hewlett-Packard Company, Palo Alto, Calif., a corporation of California
Filed Dec. 26, 1968, Ser. No. 786,894
Int. Cl. G05f 1/50
U.S. Cl. 323—1               6 Claims

ABSTRACT OF THE DISCLOSURE

A power supply has an unregulated D.C. input and a regulated D.C. output which supplies a constant current to a load. A first transistor shunts the output and is controlled by a feedback loop to maintain the output voltage less than a predetermined reference voltage. The series combination of a second transistor and a diode also shunts the output and serves to clamp the output voltage near the reference voltage whenever there is a tendency for the output voltage to increase rapidly, due to disconnection of the load, for example.

BACKGROUND OF THE INVENTION

In a constant current power supply, the output voltage at the load terminals is a function of the load impedance and the preset output current flowing therethrough. This type of power supply maintains the output current constant with variations in the load impedance by automatically adjusting the output voltage. In the case where load impedance is made large and larger, the output voltage supplied thereto will be automatically increased and will eventually exceed the rated voltage of the power supply. Any further increase in the load impedance will cause the output voltage to reach a maximum value determined by the maximum output capabilities of the power supply. This maximum voltage may be up to twice the rated output voltage of the power supply, and may seriously damage the load.

The aforementioned output voltage behavior is particularly dangerous when the load is physically disconnected from the power supply by a user. In this instance, the impedance across the load terminals suddenly increases to infinity, with the result that a large overshoot voltage spike is produced at the output. This voltage spike is likely to be harmful to anyone who disconnects the load.

SUMMARY OF THE INVENTION

The present invention eliminates the aforementioned disadvantages by providing a circuit for limiting the maximum output voltage which can appear at the load terminals to a value near to or less than the rated output voltage of the constant current power supply. The illustrated embodiment of the voltage limiting circuit of the invention includes first and second variably conducting means, each of which is connected in shunt with the load terminals. The first variably conducting means may be a transistor, for example, which is controlled by a comparison amplifier responsive to the difference between the load terminal voltage and a predetermined reference voltage. The second variably conducting means includes the series combination of a diode and a transistor, the latter of which has a control electrode coupled to the reference voltage. This series combination operates to clamp the load terminal voltage to a value no larger than a small voltage increment above the reference voltage. In the event that the rate of increase in the load terminal voltage exceeds the responsive time of the first variably conducting means, the second variably conducting means operates and prevents the occurrence of an overshoot voltage spike.

BRIEF DESCRIPTION OF THE DRAWING

The single figure is a schematic diagram of the preferred embodiment of the present invention.

DESCRIPTION OF THE PREFERRED EMBODIMENT

Referring now to the figure, there is shown a constant current supply 11, which receives an unregulated direct current input and provides a regulated constant direct current to a pair of output terminals 13, 15 which are connectable to a load 17. The constant current supply 11 may be of conventional design and may include, for example, a main regulating element connected in series between the input and output terminals, and a feedback circuit for controlling the conduction of the regulating element in response to the output current.

An NPN transistor 19 has its collector-emitter current path connected in shunt between the two output terminals 13, 15. The conduction of this transistor is controlled by the output from a comparison amplifier 21, which is connected in a feedback control loop. The comparison amplifier 21 may be a conventional differential amplifier which provides an output signal proportional to the difference between two input signals. One input to amplifier 21 is connected to the output terminal 13, and the other input to this amplifier is connected to a source of reference voltage $V_{ref}$, hereinafter described.

The output terminals 13, 15 are also shunted by the series combination of a diode 25 and the emitter-collector current path of a PNP transistor 27. The base control electrode of transistor 27 is connected to the reference voltage $V_{ref}$. A capacitor 29 is connected between this base electrode and the negative output terminal 15, for purposes hereinafter described.

The reference voltage $V_{ref}$ is provided by a source 31 as indicated in the figure by a dashed line rectangle. The source 31 includes a Zener diode 33, a PNP type transistor 35, and the associated emitter and base resistors therefor, which in combination provide a constant current to an adjustable resistor 37. The voltage produced across the adjustable resistor 37 is the reference voltage $V_{ref}$. The reference voltage source 31 is energized by the unregulated D.C. voltage and may be connected to the input for the constant current supply 11, as shown in the figure. The unregulated D.C. input is suitably filtered by filter capacitor 39.

Considering now the overall operation of the circuit, the variable resistor 37 is adjusted to set the reference voltage $V_{ref}$ which in turn controls the desired maximum voltage permitted at load terminals 13, 15. In normal operation, the constant current source 11 produces an output voltage which is below this maximum voltage limit. During this time, the shunt transistor 19 is biased into nonconduction by the action of the comparison amplifier 21 in the fedback control loop. Also, transistor 27 is reverse biased into nonconduction. If the impedance of load 17 is increased to the point where the voltage across terminals 13, 15 increases to the maximum voltage limit in order to maintain the output current constant, the feedback control loop causes transistor 19 to conduct. In effect, any decrease in current flow through the load 17 is compensated for by an increase in current flow through transistor 19 in order to prevent the output voltage from exceeding the reference voltage $V_{ref}$.

In normal use of the power supply circuit, a sudden change in the load impedance may occur, as in the case where the load is quickly disconnected from the output terminals 13, 15. In this instance, comparison amplifier 21 will cause transistor 19 to conduct sufficiently to counteract a rise in the output voltage. However, there is typically a time delay of several hundred microseconds before transistor 19 conducts, due to the inherent limitations in the components and the parameters of the feedback loop including amplifier 21. As a result, there is a tendency for an overshoot voltage spike to be developed at the output terminals 13, 15. However, as soon as the output voltage exceeds the sum of the reference voltage $V_{ref}$ and the combined voltage drops across diode 25 and the base-emitter junction of transistor 27 (typically not more than 2 volts), these two components conduct and clamp the output voltage to the reference voltage $V_{ref}$. As noted above, the reference voltage $V_{ref}$ is adjustable and is preset to the maximum voltage limit desired for the output voltage. When transistor 27 conducts, the base current required thereby is supplied by the capacitor 29. Since the base current is not drawn from the reference voltage source 31, the reference voltage $V_{ref}$ developed across resistor 37 is not affected and remains constant.

The rapid operation of diode 25 and transistor 27 prevents an overshoot voltage spike from occurring at the output terminals 13, 15, thus providing protection during the time delay required for transistor 19 to conduct. After this time delay, transistor 19 finally does conduct. As a result the output voltage across terminals 13, 15 is lowered to a value slightly below $V_{ref}$, and transistor 27 is biased into nonconduction.

It is to be noted that the voltage limiting circuit of the present invention requires that connections be made only to the output terminals of the constant current supply 11. There is provided an economical and simplified circuit configuration wherein overshoots in load current as well as load voltage are impossible. This is because the source 11 always supplies a constant current whether or not the voltage limiting circuit is operating. The voltage limiting circuit of the present invention can only shunt current away from the constant current source 11 and cannot adversely affect the operation of the main regulating element therein.

I claim:

1. In a regulated power supply including means for providing a constant current to a pair of terminals connectable to a load, the improvement of a circuit for limiting the maximum output voltage across said output terminals, said voltage limiting circuit comprising:
   first variably conducting means connected in shunt with said pair of load terminals;
   means providing a source of reference voltage;
   comparison means responsive to the difference between said reference voltage and the voltage at said load terminals for controlling the conduction of said first variably conducting means to maintain said load terminal voltage at a value less than said reference voltage; and
   second variably conducting means connected in shunt with said pair of load terminals for clamping the voltage at said load terminals to said reference voltage when the voltage at said load terminals rises a predetermined voltage increment above said reference voltage, thereby preventing the occurrence of voltage spikes at said load terminals.

2. The voltage limiting circuit of claim 1, said second variably conducting means including:
   a diode; and
   a transistor having a pair of main current-carrying electrodes connected in a series current path with said diode, and a control electrode coupled to said source of reference voltage.

3. The voltage limiting circuit of claim 2, further including capacitor means for supplying current to the control electrode of said transistor.

4. The voltage limiting circuit of claim 1, said means providing a source of reference voltage including means for adjusting the magnitude of said reference voltage.

5. The circuit of claim 4, said adjusting means including a variable resistor.

6. The voltage limiting circuit of claim 1.
   said first variably conducting means being a transistor having a control electrode, and a pair of main current-carrying electrodes connected in a series current path between said pair of load terminals;
   said comparison means including a differential amplifier having an output coupled to the control electrode of said transistor and a pair of differential inputs coupled respectively to said source of reference voltage and to one of said load terminals, and
   said second variably conducting means including:
      a diode; and
      a transistor having a pair of main current-carrying electrodes connected in a series current path with said diode, and a control electrode coupled to said source of reference voltage.

References Cited

UNITED STATES PATENTS

| | | |
|---|---|---|
| 2,850,694 | 9/1958 | Hamilton. |
| 3,124,697 | 3/1964 | Trenchard. |
| 3,351,848 | 11/1967 | Lodder, |
| 3,302,092 | 1/1967 | Bloom et al. |

J D MILLER, Primary Examiner

A. D. PELLINEN, Assistant Examiner

U.S. Cl. X.R.

317—16, 31, 33, 50; 323—8